United States Patent
Hagerman

[15] 3,691,262
[45] Sept. 12, 1972

[54] FIRE-RETARDANT BROMINATED ABS POLYMERS AND METHOD OF PREPARATION

[72] Inventor: Edward M. Hagerman, Royal Oak, Mich.

[73] Assignee: General Motors Corporation, Detroit, Mich.

[22] Filed: Nov. 13, 1970

[21] Appl. No.: 89,464

[52] U.S. Cl. ......260/890, 260/45.75 R, 260/45.75 K, 260/45.95, 260/880 R, 260/DIG. 24
[51] Int. Cl. ............................................C08f 41/12
[58] Field of Search...260/890, 880, DIG. 24, 94.7 A

[56] References Cited

UNITED STATES PATENTS 3,093,599   6/1963   Mueller-Tamm et al.............................260/2.5
2,590,211   3/1952   Rugar............................106/15
3,050,476   8/1962   Tress et al. .................260/2.5
3,326,832   6/1967   Rauschenbach et al..260/28.5

Primary Examiner—Murray Tillman
Assistant Examiner—C. J. Seccuro
Attorney—William S. Pettigrew and George A. Grove

[57] ABSTRACT

When an acrylonitrile-butadiene-styrene (ABS) latex is treated with elemental bromine the resin is simultaneously brominated, and coagulated and precipitated from the latex. When the isolated, brominated resin is mixed with a small amount of synergistic flame-retardant additive, such as antimony oxide, a nonburning ABS resin having good physical properties is produced.

5 Claims, No Drawings

FIRE-RETARDANT BROMINATED ABS POLYMERS AND METHOD OF PREPARATION

This invention relates to certain brominated ABS resins and to a method of their preparation. More particularly, this invention relates to brominated ABS compositions which are nonburning and which have desirable physical properties.

Previous methods of making fire-retardant polymers have generally involved mixing one or more additives with the polymer which reduce or eliminate the tendency of the polymer to sustain a flame. Such commercially available additives include heavily halogenated organics and phosphate esters. Frequently these additives are employed in combination with antimony oxide or arsenic oxide to obtain a synergistic, flame-retarding effect. ABS materials which do not contain flame-retardant additives have well balanced mechanical properties such as good impact strength, relatively high deflection temperature and good stiffness. The introduction of flame-retardant additives generally has a substantial adverse effect on this balance of properties, particularly on the impact strength.

It is an object of the present invention to provide a brominated ABS resin and a method for its preparation.

It is a further object of the present invention to provide a flame-retardant or nonburning brominated ABS composition which includes a minimum amount of flame-retardant additives. This results in a minimal change in the basic ABS composition so that many of the desirable characteristics of the resin are retained while it is rendered flame-retardant or nonburning.

It is another object of the present invention to provide a method of brominating ABS resins and subsequently rendering them nonburning. When an ABS latex is brominated in accordance with the invention it is possible to simultaneously coagulate and precipitate the brominated ABS resin from the latex.

In accordance with a preferred embodiment of my invention, these and other objects and advantages are accomplished by providing a generally conventional acrylonitrile-butadiene-styrene latex, preferably containing 25 to 40 percent by weight of the elastomeric polybutadiene component. As with conventional prior art ABS preparation techniques, at least a portion of the styrene-acrylonitrile copolymer component may be chemically grafted to polybutadiene molecules or the styrene-acrylonitrile may be present as a separate material in the latex. When the ABS latex has been formed, elemental bromine, either undiluted of in an aqueous solution, is added to the latex to simultaneously brominate the polybutadiene component of the ABS resin, and precipitate the brominated ABS resin from the latex. About half of the bromine added chemically combines with the polybutadiene at the sites of ethylenic unsaturation. Hydrogen bromide is generated as a byproduct of the bromination reaction. This acid acts to hydrolyze the soap emulsifier normally present in the latex thereby causing the coagulation and precipitation of the resin.

The precipitated, brominated ABS resin is separated by decantation or filtration and washed first with water and then with methyl alcohol. Preferably, small amounts of an antioxidant, a tin stabilizer and antimony trioxide are added to the resin. The resulting polymer may be processed at temperatures of approximately 300° F. and molded into useful articles of commerce. Sufficient bromine is added to the latex to provide a chemically combined bromine content in the ABS resin of 8 to 12 percent by weight. Brominated ABS resins containing antimony oxide produced in accordance with the invention do not burn when placed in the flame of a Fisher burner for ten seconds.

These and other objects and advantages of the invention will become more apparent from a detailed description thereof which follows.

Specific examples will further illustrate the practice of my invention.

EXAMPLE 1

450 parts of butadiene, 1,000 parts water, 40 parts sodium oleate (emulsifier), 1 part tert.-dodecyl mercaptan (modifier), and 4 parts potassium persulfate initiator were mixed together and stirred in an autoclave at 50° C. for 16 hours. The pressure was released from the autoclave and the reaction mixture removed therefrom. A portion of unreacted monomeric butadiene escaped by vaporization at this time. The remainder of unreacted butadiene was stripped from the latex with steam. The conversion of butadiene monomer to polymer was determined to be about 60 percent.

A quantity of 935 parts of this polybutadiene latex containing about 200 parts by weight polybutadiene elastomer was taken for further processing. To this latex was added 228 parts styrene, 72 parts acrylonitrile, 0.9 parts tert.-dodecyl mercaptan, 12.5 parts sodium oleate and 2.5 parts potassium persulfate. The resulting mixture was heated 6 hours at 50° C. At the completion of the reaction period the small amount of residual unreacted monomers were stripped with steam and the latex product stored under nitrogen. The resulting ABS latex contained 40 percent by weight polybutadiene. About 75 percent by weight of the styrene-acrylonitrile was chemically grafted to the polybutadiene.

A number of separate 250 gram portions of the latex, each containing about 70 grams ABS resin, were taken for further processing. To a first portion a solution of 10 grams of bromine in 400 milliliters of deoxygenated water was slowly added over a 1 hour period. At the completion of the reaction period the precipitated resin was filtered and washed with water and methanol. A phenolic antioxidant, 1 percent by weight, along with antimony trioxide, 1 percent by weight, and a tin stabilizer, 2 percent by weight, were mixed with the resin and the mixture dried. The yield of polymer mixture was 73.5 grams. It was found by analysis to have a bromine content of 8.6 percent.

The polymer was milled and compression molded at 300° F. into ⅛ inch × ½ inch × 2 ½ inches test bars. The notched Izod impact strength of the specimens according to ASTM D–256–56 was determined to be 6.4 ft./lbs. per inch of notch at 73° F. These test specimens were nonburning when placed in the flame of a Fisher burner for 10 seconds.

EXAMPLE 2

For purposes of comparison a second 250 gram portion of the ABS latex of Example 1, containing approximately 70 grams polymer, was taken for processing.

The resin was coagulated and precipitated by the addition of an aqueous solution of sodium chloride and acetic acid. No bromine was added. The phenolic antioxidant, antimony trioxide and tin stabilizer were added as in the previous example and the mixture dried. This polymer, of course, contained no bromine.

The polymer was milled and compression molded at 300° F. into the standard test specimens. The Izod impact strength was found to be 8.0 ft./lbs. per inch of notch at 73° F. These specimens were not nonburning when placed in the flame of a Fisher burner for 10 seconds.

EXAMPLE 3

Another portion of the ABS resin latex of Example 1 was taken for processing. To this latex was added a small amount of a styrene-acrylonitrile latex for the purpose of providing an ABS latex wherein polybutadiene made up only 35 percent by weight of the polymer content. To the combined latices, containing a total of 70 grams polymer, were slowly added 15 grams of bromine in 500 milliliters deoxygenated water over a 1 hour period. At the completion of the reaction period the precipitated resin was filtered and washed first with water and then methanol. Phenolic antioxidant, antimony trioxide and a tin stabilizer were added in the same proportions as specified in Example 1 and the mixture dried. The bromine content with the resulting polymer was 10.6 percent. As in the above examples the polymer was milled and compression molded at 300° F. into standard test specimens. The Izod impact strength of this brominated ABS resin containing 35 percent polybutadiene was 3.8 ft./lbs. per inch of notch at 73° F. The material was nonburning when placed in the flame of a Fisher burner for 10 seconds.

EXAMPLE 4

In a similar way, portions of the latex prepared in Example 1 were mixed with latices of styrene-acrylonitrile copolymer so that two mixed latices were prepared wherein the polymer portions contained 30 percent and 25 percent by weight, respectively, polybutadiene. Each mixed latex then contained approximately 70 grams total polymer. The latex wherein the polymer contained 30 percent by weight polybutadiene was treated with 15 grams of bromine and 500 cc. of water to brominate the polymer and precipitate it from the latex. After processing with the antioxidant, antimony trioxide and tin stabilizer, as above, the Izod impact strength of this brominated ABS composition was found to be 1.6 ft./lbs. per inch of notch at 73° F. The bromine content of the ABS resin was 10.0 percent by weight. The material was non-burning when placed in the flame of a Fisher burner for 10 seconds.

In a similar fashion the latex wherein the polymer contained 25 percent by weight polybutadiene was treated with 15 grams of bromine in 500 cc. of water. After processing with the antioxidant, antimony trioxide and tin stabilizer, as above, the resulting nonburning ABS composition had an Izod impact strength of 1.0 ft./lbs. per inch of notch at 73° F. The bromine content of this ABS resin was 10.1 percent by weight.

I have found that ABS resin compositions when brominated in accordance with my invention must contain about 8 percent by weight bromine in order to be rendered nonburning by the addition of antimony trioxide or other flame-retardant additives. Preferably, my ABS compositions contain about 8 to 12 percent by weight bromine. A greater bromine content does not contribute further to the nonburning properties of the polymer but does tend to adversely affect its physical properties.

At least about 1 percent by weight of the ABS resin of antimony trioxide or other synergistic flame-retardant material is to be employed in my ABS compositions to render them non-burning. Preferably, only about 1 to 3 percent by weight antimony trioxide is employed. Greater amounts of antimony trioxide do not improve the nonburning properties of my ABS resins but do reduce the desirable physical properties.

In accordance with the process aspects of my invention I have found that the polymer may be brominated by adding a bromine water solution to an ABS latex as illustrated in the above examples. In another embodiment of my invention, undiluted, elemental bromine may be added directly to an ABS latex resulting in both the bromination and precipitation of a solid brominated ABS resin. Alternatively, bromine vapor may be allowed to react directly with dry powdered ABS resin. In this embodiment the ABS resin is brominated and may be mixed with antimony trioxide to produce a nonburning polymer. HOwever, the resin must originally have been precipitated from its latex by conventional techniques.

When brominated ABS resins are prepared in accordance with my invention, for each 100 parts of unbrominated material there should be 25 to 40 parts polybutadiene, preferably 35 to 40 parts polybutadiene, and the balance styrene-acrylonitrile copolymer. When less elastomer is employed the physical properties of the brominated ABS resin are unsuitable for many purposes. Greater proportions of the elastomer also result in undesirable physical properties.

While my invention has been described in terms of a few specific embodiments thereof, it will be recognized that other forms could readily be adapted by one skilled in the art. Accordingly, the scope of my invention is to be considered limited only by the following claims.

What is claimed is:

1. A brominated ABS composition consisting essentially by weight of 25 to 40 parts elastomeric polybutadiene, 60 to 75 parts styrene-acrylonitrile copolymer and 8 to 12 parts bromine per 100 parts total of polybutadiene and styrene-acrylonitrile copolymer, said bromine being chemically combined with said polybutadiene.

2. A brominated ABS composition consisting essentially by weight of 35 to 40 parts elastomeric polybutadiene, 60 to 65 parts styrene-acrylonitrile copolymer and 8 to 12 parts bromine per 100 parts total of polybutadiene and styrene-acrylonitrile copolymer, said bromine being chemically combined with said polybutadiene.

3. A fire-retardant ABS composition consisting essentially by weight of 25 to 40 parts elastomeric polybutadiene, 60 to 75 parts styrene-acrylonitrile copolymer, 8 to 12 parts bromine per 100 parts total of polybutadiene and styrene-acrylonitrile copolymer and at least one part antimony trioxide, said bromine being chemically combined with said polybutadiene.

4. A method of preparing and brominating an ABS composition comprising providing a latex containing, by weight, 25 to 40 parts elastomeric polybutadiene and 75 to 60 parts styrene-acrylonitrile copolymer in water, the total of said polybutadiene and said styrene-acrylonitrile copolymer being 100 parts, treating said latex with bromine whereby 8 to 12 parts of bromine are chemically combined with 100 parts of said ABS composition, and whereby said ABS composition is precipitated from said latex, and separating the resulting brominated ABS resin from said latex.

5. A method of preparing and brominating an ABS composition comprising providing a latex containing, by weight 25 to 40 parts elastomeric polybutadiene and 75 to 60 parts styrene-acrylonitrile copolymer in water, the total of said polybutadiene and said styrene-acrylonitrile copolymer being 100 parts, treating said latex with an aqueous bromine solution containing about 16 to 24 parts of bromine whereby about 8 to 12 parts of bromine are chemically combined with 100 parts of said ABS composition, and whereby said ABS composition is precipitated from said latex, and separating the resulting brominated ABS resin from said latex.

* * * * *